United States Patent
Solhjell

[11] Patent Number: 5,872,675
[45] Date of Patent: Feb. 16, 1999

[54] TAPE CARTRIDGE WITH INTEGRATED MIRROR TRACKING MECHANISM

[75] Inventor: Erik Solhjell, Oslo, Norway

[73] Assignee: Tandberg Data ASA, Oslo, Norway

[21] Appl. No.: 786,572

[22] Filed: Jan. 21, 1997

[51] Int. Cl.$^6$ ........................................................ G11B 5/58
[52] U.S. Cl. ............................................ 360/77.01; 360/76
[58] Field of Search .......................... 360/77.01, 77.12, 360/77.13, 77.15, 77.16, 75, 69

[56] References Cited

U.S. PATENT DOCUMENTS

| | | |
|---|---|---|
| 4,609,959 | 9/1986 | Rudi . |
| 4,639,796 | 1/1987 | Solhjell . |
| 4,679,104 | 7/1987 | Dahlerud . |
| 5,414,578 | 5/1995 | Lian et al. . |
| 5,438,469 | 8/1995 | Rudi . |
| 5,450,257 | 9/1995 | Tran et al. ........................ 360/77.12 X |
| 5,452,153 | 9/1995 | Baheri et al. ..................... 360/77.12 X |

Primary Examiner—Muhammad N. Edun
Attorney, Agent, or Firm—Hill & Simpson

[57] ABSTRACT

An apparatus for sensing the position of a tape edge of a magnetic tape sliding against a magnetic head which includes a light transmitter positioned on one side of the magnetic tape and a light receiver arranged on the same side, and a reflective surface arranged on an opposite side of the tape for receiving light from the light transmitter and for reflecting light back to the light receiver. The amount of light reflected from the transmitter to the receiver depends on the amount of interference by the interposition of the magnetic tape so as to sense the edge of the tape. A light signal from the receiver is used to control the relative position of the head to the tape to correct for tape wander. One pair of light transmitters/receivers can be used, or more than one pair such as four pairs of light transmitters/receivers and corresponding reflective surfaces, to accurately position a tape head with respect to a magnetic tape, by determining a dynamic position of the tape edge.

8 Claims, 4 Drawing Sheets

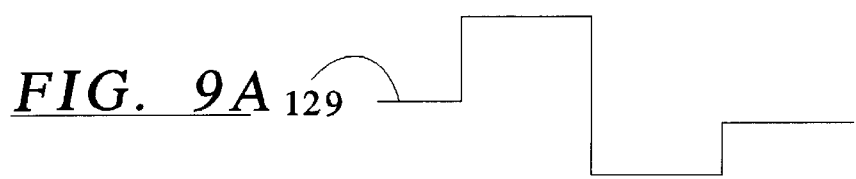
FIG. 9A 129
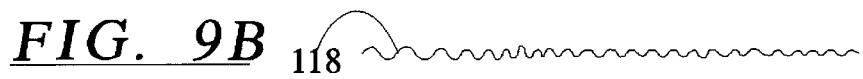
FIG. 9B 118
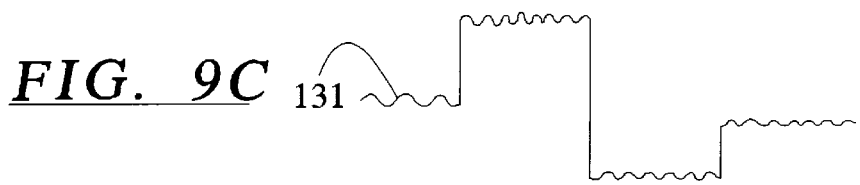
FIG. 9C 131
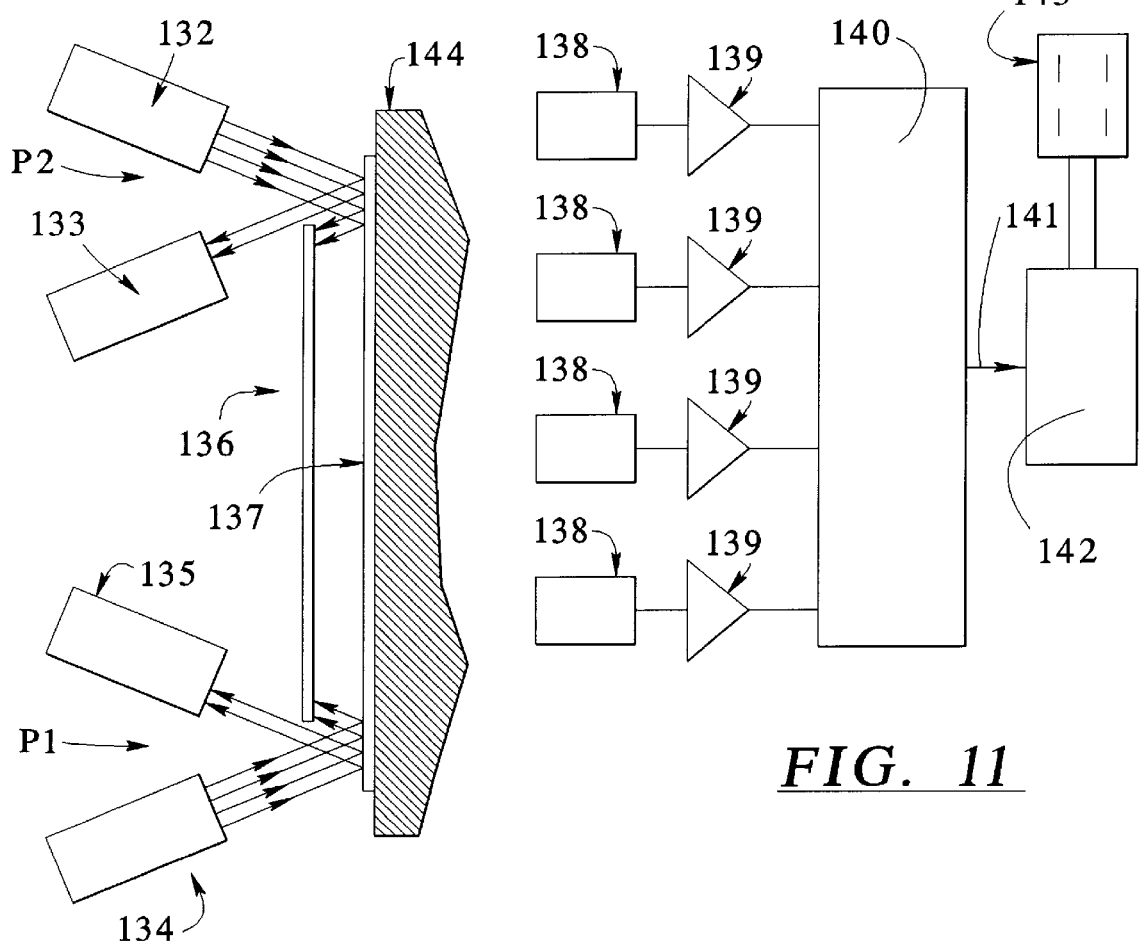
FIG. 10
FIG. 11

TAPE CARTRIDGE WITH INTEGRATED MIRROR TRACKING MECHANISM

BACKGROUND OF THE INVENTION

In the field of tape recording, both magnetic and optical recording, a constant goal is to increase the total storage capacity on a given media, such as a tape cassette or cartridge. This goal can be achieved in many ways, including the use of longer and/or wider tape.

When the tape length and width are preset, the total capacity may be increased by increasing the number of recorded tracks on the tape, i.e., increasing track density, or by increasing the linear data bit density on each track. Track density is often measured in tracks per inch ("tpi"), while linear bit density is often measured in bits per inch ("bpi").

For many years increasing track density has been a very effective way of increasing the total storage capacity. For example, the popular 3M cartridge, often referred to as a "QIC" cartridge or a "DKC6000" type cartridge, has increased in capacity from 20 MBytes in 1983 to 13 GBytes in 1996. The 20 MBytes capacity was achieved by recording on four tracks on a one-quarter inch wide tape. This therefore gives a track density of 16 tpi. The 13 GByte format employs 144 data tracks on the same tape width. The data track density is therefore 576 tpi. Other types of tape cassettes and cartridges have undergone the same improvements. For example, the small Minicartridge ("DC 2000"-cartridge) and its new companion, the TRAVAN cartridge have over a similar period gone from 8 tracks on a one-quarter inch wide tape, to 76 tracks and soon 109 tracks on an 8 mm wide tape (as used in the TRAVAN cartridge).

In theory, increasing the number of tracks is a very simple way to increase the total storage capacity. In the past, the upper limit to the number of tracks was set by the recording head, the read/right head. With previous technology, it was difficult to design heads which could record and read on vary narrow tracks. However, with the invention of thin film magneto-resistive heads, very narrow recording/read heads can be achieved economically. Therefore, head technology today allows for very narrow tracks, thus making it possible to increase the number of tracks on a given tape width far beyond what was possible just a few years ago.

Unfortunately, another limitation makes it difficult to maximize the number of tracks and use very high track numbers which the new head technology offers, and that relates to the stability of the tape itself as it passes over the head during read/write operations. With very high track densities, it becomes critical that the tape substantially maintains the same position as it passes over the head. To achieve this stability, all tape drives utilize some form of tape guides. Normally, tape guides are placed on each side of the head as shown in FIG. 1. Here, a read/write head 100, a tape 103, tape guides 101, 102, and base plate 104 which mounts the guides, are illustrated. Such tape guides can either be built into the tape cassette itself on the base plate, as it is for the 3M DC6000 cartridge and the DC2000 and TRAVAN cartridges, or can be designed as an integral part of the tape drive as for example as used for small Phillips type cassettes. In either case, the tape guides must be designed so that it can keep the tape in a very stable position as it passes across the head.

To avoid problems of either overwriting previously recorded tracks or not reading in the correct position, the maximum vertical movement, perpendicular to the tape length, allowed for the tape between the tape guides must be only a fraction of the distance between two adjacent tracks. Therefore, as track width, and the distance between adjacent tracks, becomes smaller and smaller, the tape guiding must be improved in corresponding fashion.

Hence, as the head is designed for narrower and narrower track widths, such as based on the new thin film technology, tape guiding has become more and more critical. To keep costs down, most tape guides are designed with fixed flanges. Some high end expensive tape drives utilize guides with one side spring loaded. This is expensive and also requires a fairly high tape tension to work properly. For low-cost small form factor tape drives, such spring loaded tape guides are normally too expensive and impractical, and even may not work in many systems due to low tape tension.

With fixed flanges on the tape guides, the tolerance in tape width and the tolerance in the distance between the upper and lower flanges of a tape guide make it very difficult to design a tape guiding system with the stability required by the new high density, high tpi, thin film heads now available. The tape guides must be designed so that even with a tape having a maximum tape width, or having a maximum tolerance on the tape width, running in a cassette or tape drive where the distance between the tape guides is at its minimum level, the tape can still pass correctly between the guides. Although the tape manufacturers have been able to improve tape slitting very much over recent years, it is still a certain tolerance in the tape width along any given tape. Furthermore, the tape will also expand or contract depending upon humidity and temperature. Therefore, the tape guides must be designed to allow for some tolerance in the tape width.

Coupled with the necessary tolerances of the tape guides themselves, this space allocated for the tolerance in the tape width will unavoidably lead to the tape typically having some play between the guide flanges. Very often this leads to the tape "wandering" between an upper and a lower position during operation as demonstrated in FIG. 2. The total tape wander between guides ("d" in FIG. 2) must be much less than the width of a recorded track, or the distance between two adjacent tracks, in order to avoid writing in an incorrect position, overwriting previously recorded data, or not being able to read previously recorded data. While FIG. 2 exaggerates the tape wander in a normal cartridge, nevertheless the problem of tape wander plays an important role in modern tape drive designs.

In addition to tape "wandering" between the guides, shock and vibrations may also cause the tape to change its position relatively to the head during operations.

To overcome these problems and allow for very narrow tracks, a technology called servo-tracking has been introduced during the 1990's. With this technology, special tracks named servo-tracks are precisely recorded along the tape during manufacturing. The tape drives utilizing such tapes are designed so that they are able to detect the position of the servo-track(s) as the tape passes over the tape, and by means of a voice coil or similar technology, constantly repositions the head so that it stays in the correct position relatively to the tape. This principle is used in the new 13 GB DC 6000 system mentioned earlier. This system has 24 prerecorded servo-tracks in addition to the 144 data tracks. The total track density for this system is thus (144+24)×4=672 tpi.

Unfortunately, while such servq systems make it possible to design tape drives with very high track density, it also adds significantly to the cost and complexity of the tape drive and the tape cartridge itself. Low cost tape drives, often with a small form factor, cannot easily utilize such complex and costly servo-designs. For these drives, attempts have been made to improve the number of tracks in a tape cartridge by constantly reducing the tolerance of the tape width and the play between the tape and tape guides. However, with tighter and tighter tolerances, the cost of improving the guiding is increasing significantly.

Therefore, it is advantageous to provide a method which makes it possible to monitor the variations in tape position, and correct for these variations, without adding significantly to the cost or complexity of the tape drive or the tape cartridge. Such a method is described for example in U.S. Pat. No. 4,639,796. This patent teaches the method of utilizing light to monitor either one or both edges of the tape by placing a transmitter along one side of a tape edge and a receiver on the opposite side of the tape edge. The variation in tape position will result in a varying light signal detected by the receiver. The signal is converted to a corresponding electrical signal which can be used to either make the necessary corrections in the head position or in the cartridge position so that the relative position between the tape and the head is stable along a track.

While the principle of U.S. Pat. No. 4,639,796 will work adequately in many systems, small tape cassettes and drive systems having a small form factor may make it difficult or sometimes impossible to position the light transmitter and receiver correctly on opposite sides of the tape edge. The purpose of this invention is therefore to overcome this problem by a new method which makes it simple to utilize the principle of tape edge following using light, even for physically very small tape cassette systems.

SUMMARY OF THE INVENTION

It is an object of the invention to provide a tape positioning device which is precise in operation and compact in design. It is an object of the invention to provide a head positioning device which responds to a tape edge position signal to accurately deploy a tape head to a running tape. It is an object of the invention to provide a tape position sensor and control which is an improvement to prior art light following-type tape edge sensors.

An object of the invention is achieved by providing a light transmitter adjacent a tape edge and a reflective surface such as a mirror surface on an opposite side of the tape edge, and a light receiver position to receive reflected light from the mirror surface. The light receiver can be mounted close to the light transmitter for a compact design. Multiple transmitter/receiver pairs can be used on one or both tape edges for accurate positioning of the tape and compensating for variations such as tape temperature expansion/ contraction, shock and vibrations, small tape edge damage, and tape slope errors.

A position feedback signal can be conditioned and fed to a head positioning device such as a voice coil positioner, piezo-electric positioner, or a screw mechanism head stepper.

BRIEF DESCRIPTION OF THE DRAWINGS

FIG. 9A is a graphical diagram of a tape position signal;

FIG. 9B is a graphical diagram of a head correction signal;

FIG. 9C is a graphical diagram of a corrected head correction signal;

FIG. 10 is a schematic sectional view of a further embodiment of the tape position indicator of FIG. 3B; and FIG. 11 is a circuit block diagram of the embodiment FIG. 10.

DETAILED DESCRIPTION OF THE PREFERRED EMBODIMENTS

According to the invention a light transmitter and receiver can be placed on the same side of a tape, to sense a tape edge, thereby drastically simplifying the complexity of positioning these devices correctly and precisely, and the problem of finding enough room for the receiver (or transmitter) on the opposite side of the tape edge. Additionally, plural pairs of light transmitters and receivers can be used.

Figure 3A:
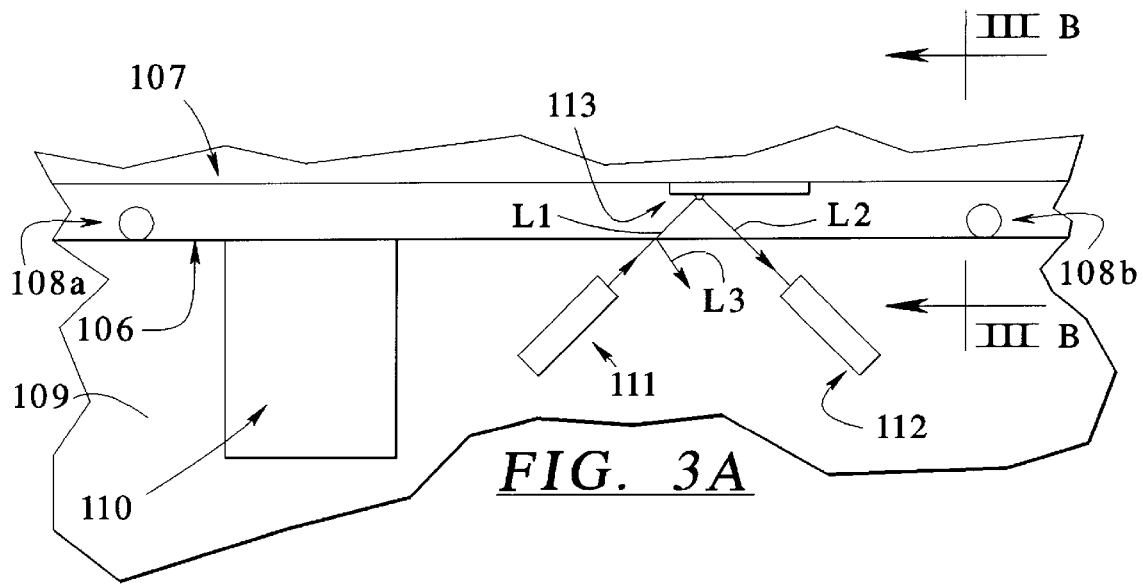
FIG. 3A is a schematic plan view of a magnetic head and tape guide arrangement of the present invention.
Figure 3B:
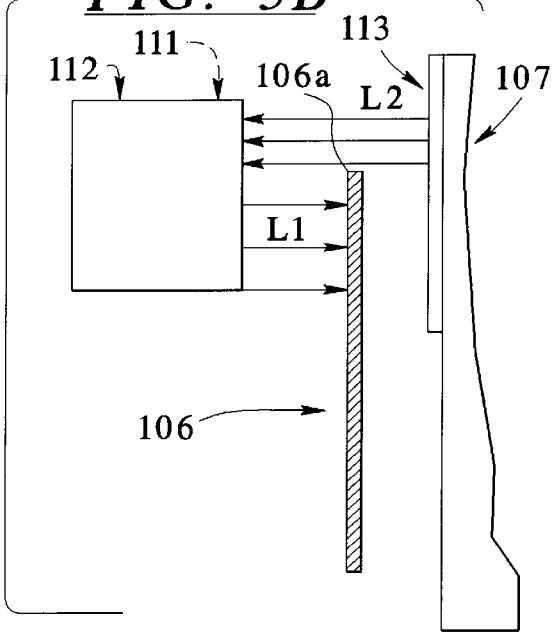
FIG. 3B is a schematic sectional view taken generally along line III B—III B of FIG. 3A.

The basic method and apparatus is shown in FIGS. 3A and 3B.

FIG. 3A shows the basic principle seen from above, while FIG. 3B shows the transmitter/receiver set up together with the tape as seen from a side. Tape 106 is part of a cartridge/ cassette housing 107. A left tape guide 108a and a right tape guide 108b may be part of the cassette housing 107, or part of a tape drive 109. A read/write head 110, a light transmitter 111 and a light receiver 112 are provided in the tape drive 109. These light transmitter can emit visible or nonvisible light L1. The light receiver can receive the visible or non-visible light L2 reflected from the mirror 113. The light L1 can either be continuous or sent in pulsed form. A typical transmitter can be a small effect laser or a simple LED with a proper light focusing lens in front thereof. The receiver can typically be a photo transistor or similar type of light sensing device. The transmitter and receiver will normally be integrated into one housing to insure proper alignment. The transmitter is positioned so that some of its light L1 always will pass over the tape edge and some of the light will be blocked by the tape.

On the other side of the tape, opposite the transmitter/ receiver, a mirror 113 is placed parallel to the tape length. This mirror is conveniently and cost effectively mounted on the tape cartridge or cassette itself.

Figure 1:
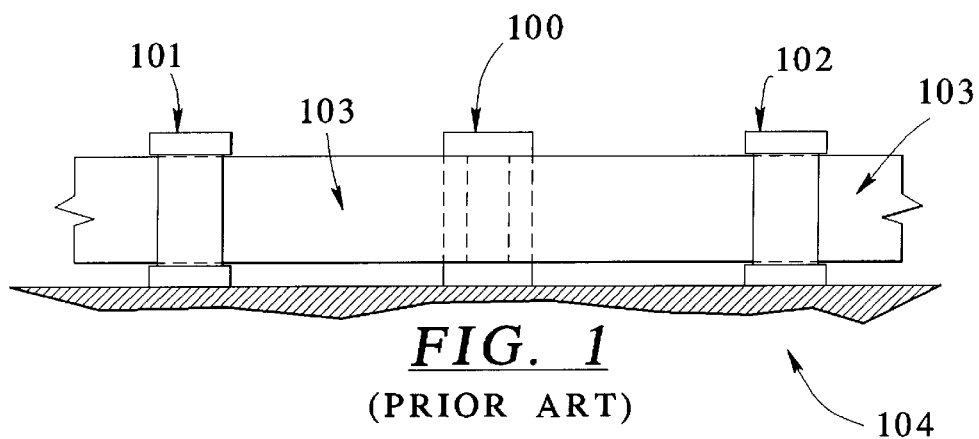
FIG. 1 is a schematic elevational view of a prior art head and tape guide arrangement.
Figure 2:
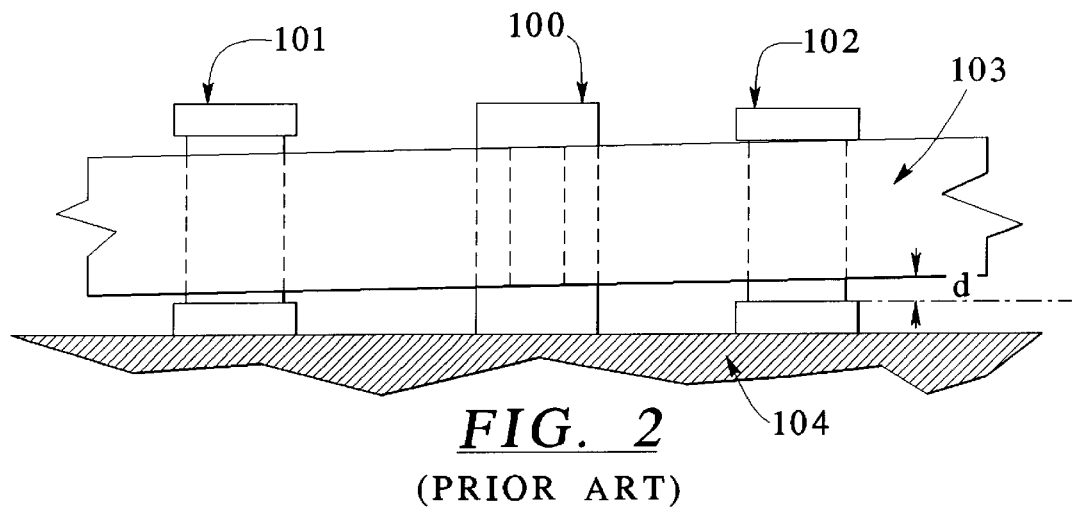
FIG. 2 is an enlarged schematic elevational view of the prior art tape guide arrangement of FIG. 1.

The transmitter/receiver and the mirror can be placed close to the recording/reading head of the tape drive. By proper alignment, some of the light $\Lambda 2$ from the transmitter 111 will hit the mirror 113 and be reflected back to the receiver 112, provided that the receiver and the transmitter are aligned at correct angles to each other. The transmitter and receiver system will normally be positioned so approximately 50% of the transmitted light passes over the tape edge and reaches the receiver when the tape is its nominal vertical position, i.e., the tape located 0.5 d downward from the maximum wander position shown in FIG. 2.

Figure 4:
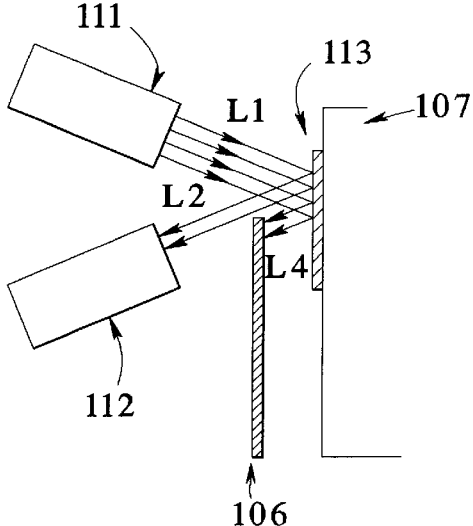
FIG. 4 is a schematic sectional view of an alternate arrangement of the present invention.

FIGS. 3A and 3B illustrate the invention with the light transmitter and receiver aligned horizontally, i.e., located to operate in a horizontal plane. The transmitter and receiver can also be placed to operate in a vertical plane as shown in FIG. 4. The basic principle is the same in both cases. In the embodiment of FIG. 4 some of the light L4 reflected from the mirror 113 is blocked by the tape 106 from reaching the receiver, depending on a vertical position of a tape edge 106a.

When designing this transmitter/receiver system, it is important to avoid problems due to light L3 being reflected back from the tape surface. While the tape typically reflects far less light than a mirror, especially the front, magnetic side of modern tapes can be fairly reflective. This problem is reduced by positioning the mirrors some distance away from the tape and aligning the transmitter and the receiver so that any reflected light from the tape normally does not hit the receiver.

FIG. 4 with vertical position of transmitter/receiver make it better protection against reflection problems, because most of the reflection will take place on the back side of the tape from light L4 and not interfere with the light to the receiver. Additionally, the back side of most tapes normally reflects far less light than the front side. It is also possible to design positions of receivers/transmitters which are a combination of FIGS. 3 and 4, i.e., both vertically and horizontally offset.

The transmitter and the receiver are effectively utilized as part of an electro-mechanical circuitry designed to keep the tape in an almost perfect constant position relative to the head as it passes over the head.

Figure 5A:
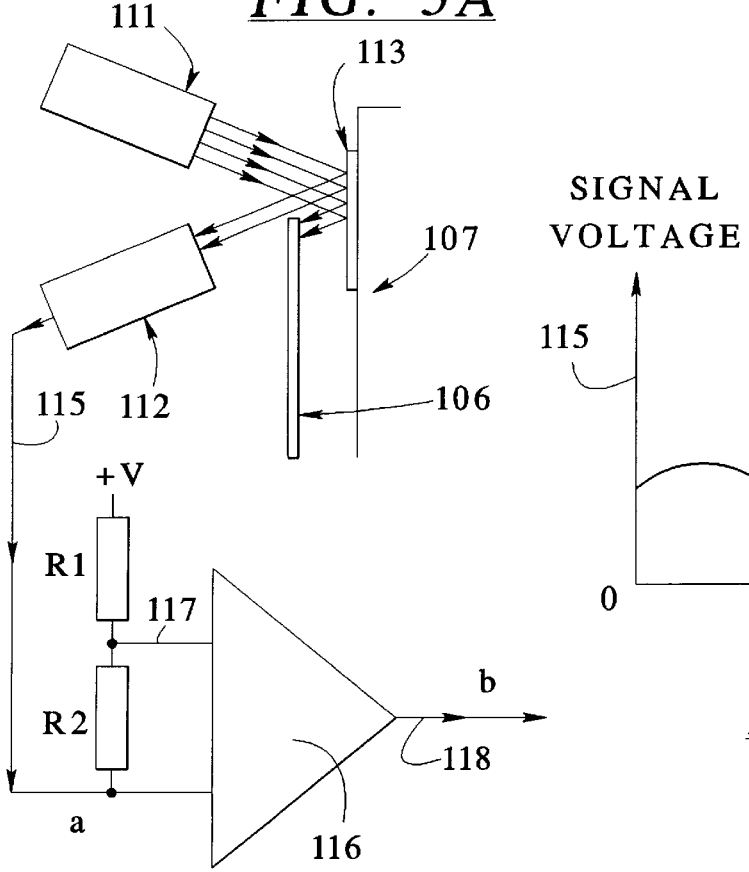
FIG. 5A is a schematic view of the arrangement of FIG. 4 including a head positioning circuit.

One method is shown in FIG. 5A. Here a signal 115 is sent from the receiver 112 which is dependent on the amount of light received by the receiver. The signal 115 is compared in a comparator circuit 116 with a stable reference signal 117. As the tape runs across the head, the signal 115 from the receiver will vary depending upon the actual tape position, i.e., the amount of light L2 from the transmitter 111 which hits the receiver 112 at any given moment after first passing across the edge 106a of the tape from the transmitter 111, then being reflected by the mirror 113, and then again passing over the tape edge 106a. The output signal 118 from the comparator shown in FIG. 5B therefore shows how the tape varies from its nominal position, as given by the reference value 117.

Figure 5B:
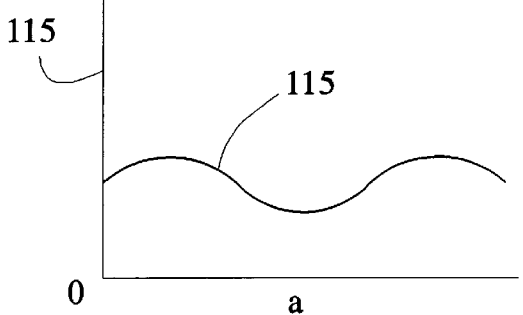
FIG. 5B is graphical diagram of a tape position signal from the circuit of FIG. 5A.

FIG. 5B shows the waveform taken at the location "a" in FIG. 5A.

Figure 6:
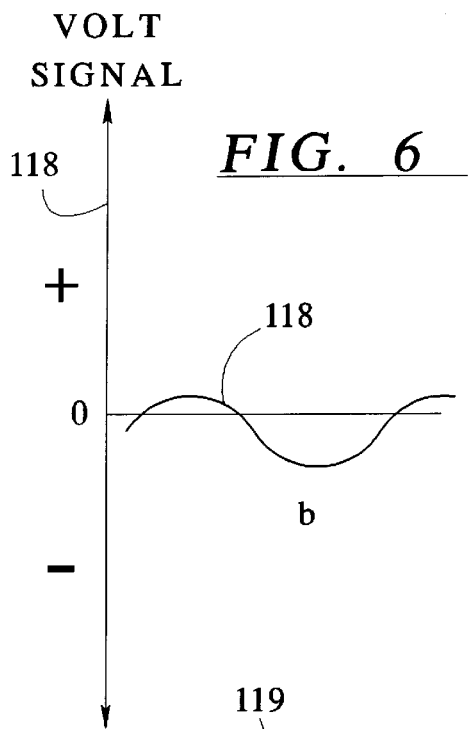
FIG. 6 is a graphical diagram of a head correction signal from the circuit of FIG. 5A.

FIG. 6 shows such a typical output signal 118 as the tape runs across the head. Note that the fact that the light passes over the edge twice, when the transmitter and the receiver are positioned in a horizontal position, such as shown in FIG. 3A and 3B, will help level out any short distance irregularities along the tape edge, such as a dust particle or a very short distance cut in a tape edge. FIG. 6 shows the waveform taken at the location "b" in FIG. 5A.

To keep this tape in a stable position relative to the head 110, signal 118 is used to constantly change the vertical head position in order to keep the head and tape in the substantially same relativel position to each other as the tape is running.

Figure 7:
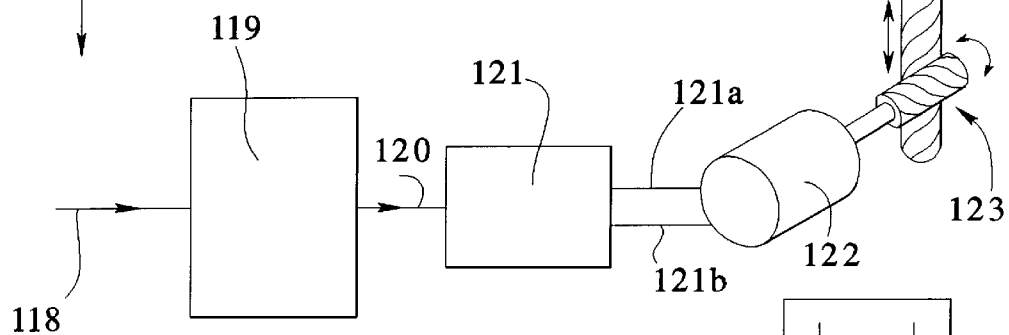
FIG. 7 is a schematic block diagram of a head positioning mechanism.

FIG. 7 shows a method whereby signal 118 is converted to a corresponding digital signal 120 by an A/D converter 119. The output signal 120 is therefore a digital number which varies between positive numbers, when the tape wander has lifted the tape above its nominal mid-position, and negative numbers, when the tape is below its nominal mid-position. This signal 120 is fed into a digital control circuit 121 which has outputs driving a fast step motor 122. The digital circuit 121 can easily be constructed using a micro processor as it controlling element. This digital circuit 121 will read the value of the input signal 120 many times a second, and sends signals 121a, 121b to the step motor 122 to step it up or down to a position which corresponds with the value of the digital input signal 120. This step motor is connected to the head 110 via a lead screw system 123. Therefore, as the signal 118 varies due to wander, this digital control system will continuously, or actually at very narrow intervals, step the head up and down so that it can follow the tape wander with just a minimum delay, and minimum tape following error. The resolution in the digital control system in the step motor/lead screw must be adequate to correctly follow the tape wander. The parameters of the digital control system and the step motor/lead screw must be adapted to the specific tape cassette/cartridge, tape speed and other parameters influencing the instantaneous vertical tape position, the tape wander. Screw system stepper motors for head positioning are disclosed for example in U.S. Pat. Nos. 4,609,959 and 4,679,104.

The step motor/lead screw system with digital control as shown in FIG. 7 can also be used to move the head from one vertical track position to another vertical track position during track turn-around. Combining the ability to step the head from track position to track position while also being able to follow the instantaneous tape wander make it possible to design very cost effective and physically small tape drive.

Figure 8:
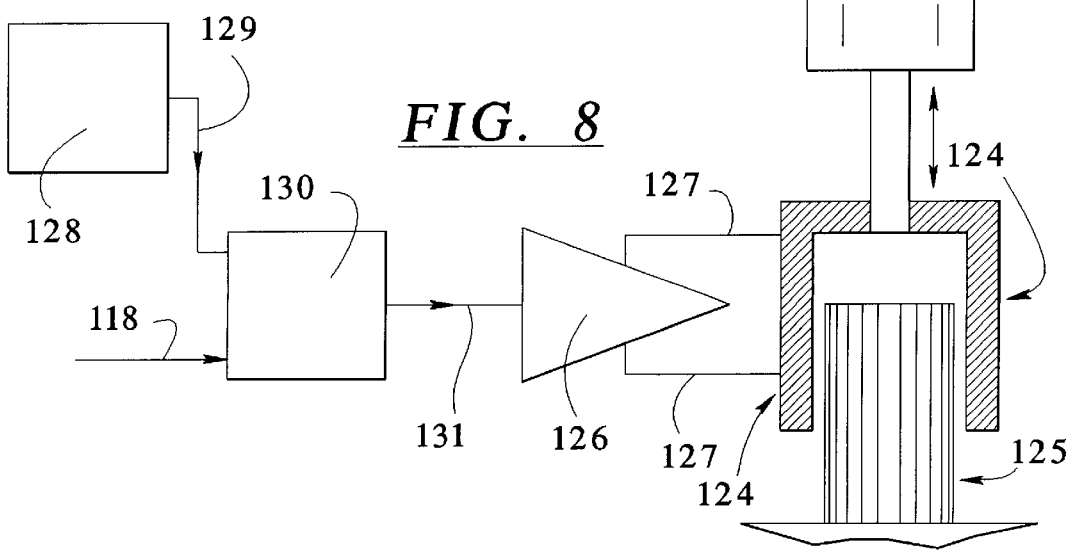
FIG. 8 is a block diagram of an alternate head positioning mechanism.

The step motor/lead screw system is one way to move the head. Alternative apparatus can also be used to accomplish the same operation and also combine the normal movement of the head from one track position to another track position with the ability to rapidly follow the tape position variations within the tape guides, perpendicular to the normal tape direction. FIG. 8 shows a system using a voice coil system. The head 110 is connected to an electric coil ("voice coil") 124. The voice coil surrounds a magnet 125. The voltage to drive the voice coil is produced by a driver 126. Depending upon the strength of the signal 127 from the driver, the voice coil will position itself higher or lower relative to the magnet 125.

An electrical track control circuit 128 is used by the tape drive to control the head positioning to each track position, i.e., each nominal track position. Circuit 128 sends out a signal 129 which corresponds to the selected nominal track position. This signal is fed to a modulator 130 which also receives the output signal 118. If the output 118, shown in FIG. 6, is zero representing no tape wander, the output 131 of the modulator will reflect the necessary voltage signal to position the head at the nominal selected track position. However, with tape wander present, signal 118 will vary around zero. This will modulate the output 131 from the modulator 130 which in turn will modulate the voice coil driving current 127. The voice coil will then follow the variations given by the tape wander signal 118.

FIG. 9A–9C shows typical signal levels. Signal 129 varies according to the select nominal track position at any given time. Signal 118 varies according to the tape wander. The output 131 from the modulator 130 then is the instantaneous sum of signal 129 and signal 118. Signal 131 will then, through amplifier driver 126, drive the voice coil. The voice coil will therefore continuously be in a position given by the instantaneous level of signal 131.

The tape drive will, through control circuit 128, always send out a signal 129 which has a level corresponding to the selected nominal track position. For this system to work properly, the voice coil must have a linear moving range large enough to cover the required vertical distance given by the tape width, the head configuration, such as the number of read/write channels in the head and their individual positions, and the tape format layout.

FIG. 8 therefore shows how the instantaneous tape wander error is corrected by moving the head to a position which corrects for the error. A voice coil system is disclosed in U.S. Pat. No. 5,414,578.

Other methods may be utilized to both move the head between the nominal track positions while also allowing for the necessary fine-tuning of the head position to accomodate for the instantaneous tape wander between the guides. For example, instead of the voice coil already described, a system based upon a movement device using a piezo-electrical driving element can be implemented. Like the voice coil, the piezo-electrical element can move the head up and down in steps corresponding to the nominal track position while also fine-tuning the instantaneous head position to correct for tape wander. A piezo-electric system is disclosed for example in U.S. Pat. No. 5,438,469. Likewise, for extremely precise and very high-frequency tape following systems, it is possible to combine for example a step motor for the coarse track-to-track stepping with a voice coil or a piezo-electrical element to correct for the instantaneous tape position errors such as disclosed in U.S. Pat. No. 5,414,578.

FIGS. 3 and 4 show a system utilizing one transmitter and receiver. While practical for systems not requiring the highest precision, very precise, high track systems can utilize several pairs of transmitter/receivers. FIG. 10 shows one transmitter/receiver pair P1 placed at the bottom edge of the tape with another pair P2 placed on the top side of the edge of the tape. An upper transmitter 132 and an upper receiver 133 are shown above a lower transmitter 134 and a lower receiver 135. A tape 136, a mirror 137 and a cassette/cartridge housing 144 which supports the tape and the mirror are shown. By using a pair of transmitter/receivers as shown in FIG. 10, variations due to, for example, temperature variations, and/or shock and vibrations can more easily be detected and corrected. It is also possible to increase precision and accuracy even further. Another method can be to place one transmitter/receiver pair on each side of the head in a tape longitudinal direction. Both pairs can either be on the same tape edge side, or one pair can be placed at the bottom side and one at the top side.

It is also possible to utilize three pairs of transmitter/receivers. On one side of the head in the tape longitudinal direction there will be one pair at the bottom edge of the tape, and one pair at the top edge; on the other side of the head, one pair is placed either at the bottom or top edge of the tape.

Finally, it is possible to utilize four pairs of transmitter/receivers: one pair at the bottom edge and one pair at the top edge of the tape on each side of the head in the tape longitudinal direction. Although this configuration is the most expensive, this configuration will provide the tape drive with the maximum information about the tape behavior, including tape variations due to temperature expansion, shock, vibration, small tape edge damage, tape slope errors, etc. Therefore, the use of four pairs makes it possible to calculate the exact tape position error just at the point of the head where the write or read operation is performed. It is of course important that the transmitter/receiver pairs and the mirror integrated into the tape cartridge/cassette are placed as close to the recording/read head as possible. The mirror must also be large enough to cover the whole reflection area as required by the number and position of transmitters/receiver pairs. The long mirror 137 can be used, or on two or more small mirrors 113 can be used.

As already mentioned, the mirror should normally be placed parallel to the tape itself. It can be made as an integral part of the cartridge/cassette housing 107 for example by glueing the mirror to the housing.

To fully utilize the information provided by the 2, 3 or 4 pairs of transmitters/receivers, each of the output signals from the receivers can be fed to a special control circuit as shown in FIG. 11. Here the signal from each receiver 138 is converted into digital form by an A/D converter 139 and then fed to a micro processor circuit 140 which constantly monitors the output signals from all receivers and based upon this information, calculates continuously the optimum tape position correction signal 141 relative to the selected nominal track position. This signal 141 is then fed to head driving system 142 such as the voice coil, stepper motor, etc. as earlier described, to drive a head 143 up or down to correct for tape wander.

While a system has been described which corrects for instantaneous tape errors by fine-tuning the head position, it is also possible to make such a system which moves the tape guides up or down to correct for the instantaneous tape position variation instead of, or in addition to, moving the head. For most drive designs, however, moving the head is more practical.

Although the present invention has been described with reference to specific embodiments, those who are skilled in the art will recognize that changes will made thereto without departing from the scope and spirit of the invention as set forth in the appended claims.

I claim as my invention:

1. An apparatus for sensing a position of a tape edge of a magnetic tape for controlling position of a magnetic head relative to the tape, comprising:

a planar mirror having a planar face parallel with and facing a first side of the tape and positioned spaced from said first side of the tape;

at an opposite second side of the tape a light transmitter arranged to direct a light beam at a downward angle relative to horizontal so as to substantially miss and not be blocked by a first longitudinal edge of the tape and strike the mirror and such that a reflected light beam has a substantially portion of its beam blocked by the first side of said tape adjacent to said first edge with a remaining part of the beam not being blocked by the tape;

a light receiver positioned to receive the unblocked portion of the reflected beam incoming at an angle relative to horizontal; and a control circuit for receiving an output from the light receiver and for controlling a relative position of the magnetic head and tape to each other.

2. The apparatus according to claim 1 wherein the first and second sides of the tape are arranged vertically and spaced from a planar face of a cartridge housing which is parallel to the first side of the tape and where said mirror is mounted and wherein the light beam from the transmitter and the reflected light beam lie in a vertical plane perpendicular to the first and second sides of the tape and perpendicular to the mirror planar face.

3. The apparatus according to claim 1 wherein the control circuit controls magnetic head position relative to the tape.

4. The apparatus according to claim 1 wherein a track control circuit is provided to control head positions to tracks on the tape, an output of the track control circuit being fed to a first input of a modulator, a second input of the modulator receiving a signal representative of a signal from said receiver, an output of the modulator being connected to a voice coil surrounding an end of a magnet, and the voice coil being connected to said magnetic head for moving said magnetic head based on the output of the modulator.

5. The apparatus according to claim 4 wherein the receiver connects to a comparator which then provides signals adjusted according to a reference established by the comparator to said modulator.

6. The apparatus according to claim 1 wherein the mirror is positioned such that approximately a mid-point of the mirror is adjacent to said first tape edge.

7. The apparatus according to claim 1 wherein the mirror extends from above said first edge of said tape to below an opposite second edge of said tape, and wherein another light transmitter and another light receiver are arranged relative to said second tape edge so that the transmitter transmits a light beam upwardly towards said mirror but so as to substantially not be blocked by said second tape edge and wherein a reflected light beam corresponding to said light beam from another transmitter is partially blocked by portions of said tape at said second tape edge with remaining unblocked portions being received by said second receiver.

8. An apparatus for sensing a position of a tape edge of a magnetic tape for controlling position of a magnetic head relative to the tape, comprising:

a vertically arranged planar mirror or a surface of a tape cartridge having a planar face parallel with and facing a first side of the tape carried by the cartridge and positioned spaced from said first side of the tape;

at an opposite second side of the tape a light transmitter arranged to direct a light beam at a downward angle relative to horizontal so as to substantially miss a first longitudinal edge of the tape and strike the mirror and such that a reflected light beam has a substantial portion of its beam blocked by the first side of said tape adjacent to said first edge with a remaining part of the beamn not being blocked by the tape;

a light receiver positioned to receive the unblocked portion of the reflected beam incoming at an angle relative to horizontal; and a control circuit for receiving an output from the light receiver and for controlling a relative position of the magnetic head and tape with respect to each other.

* * * * *